United States Patent [19]
Tkachenko et al.

[11] 3,791,460
[45] Feb. 12, 1974

[54] PROGRAM CONTROL OF THE BOOM POSITIONER AND THE FEEDER OF THE DRILLING TOOL OF A SELF-PROPELLED DRILLING

[76] Inventors: Artem Mikhailovich Tkachenko, 11 linia, 198, kv. 20; Karl Batyrbekovich Mustafin, 1 Mikroraion, 54, kv. 46; Gennady Alexeevich Starodubov, ulitsa Khaliulina, 22, all of Alma-Ata, U.S.S.R.

[22] Filed: Oct. 12, 1972

[21] Appl. No.: 296,818

[52] U.S. Cl.................................. 173/43, 173/45
[51] Int. Cl................................... E21c 11/00
[58] Field of Search........................ 173/42–45

[56] References Cited
UNITED STATES PATENTS
3,307,637    3/1967    Jonsson.......................... 173/45 X Primary Examiner—Ernest R. Purser
Attorney, Agent, or Firm—Holman & Stern

[57] ABSTRACT

A program controller of the boom positioner and the feeder of a drilling tool, which comprises a program carrier fashioned as a variable pitch screw and nuts mounted on said screw with the possibility of longitudinal travelling, the number of said nuts not corresponding to the programmed number of holes, plus a drive for insuring the reciprocating motion of the screw.

2 Claims, 1 Drawing Figure

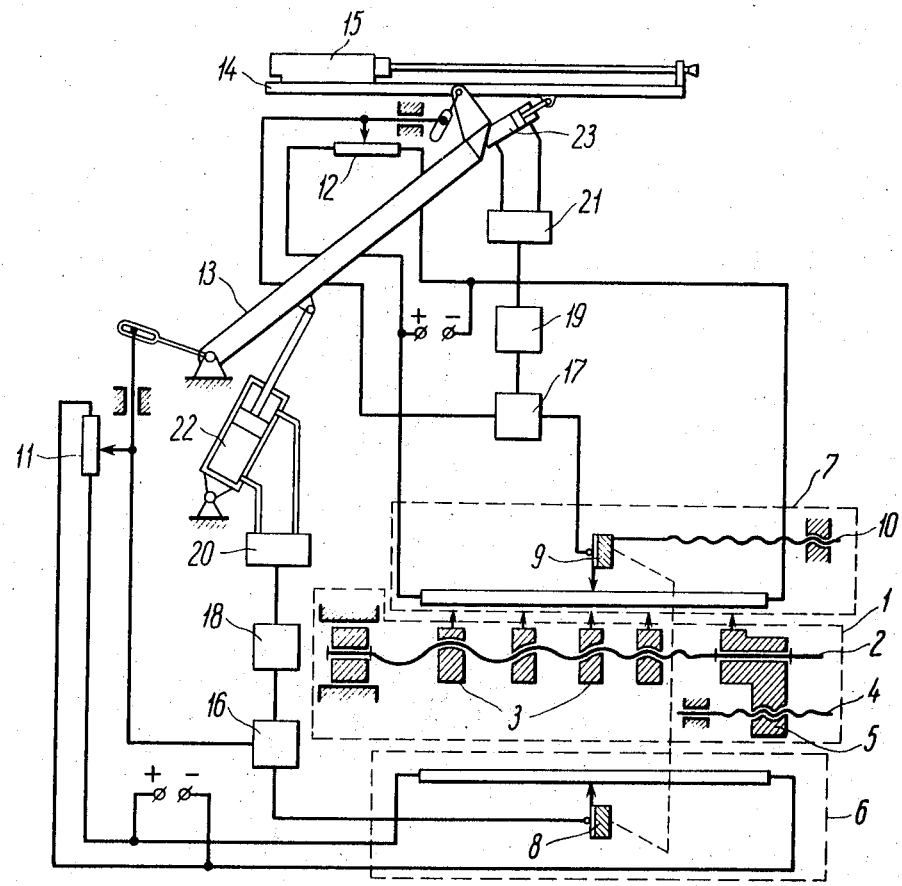

PROGRAM CONTROL OF THE BOOM POSITIONER AND THE FEEDER OF THE DRILLING TOOL OF A SELF-PROPELLED DRILLING

The present invention relates to devices for the program control of the boom positioner and the feeder of the drilling tool of a self-propelled drilling rig.

Known in the art is a program controller of the positioner and the feeder of a drilling tool, which comprises: program presetters fashioned as sectional potentiometers connected, together with the sensors indicating the position of the positioner and the drilling tool feeder, to the inputs of comparators; amplifiers whose inputs are connected to the outputs of the comparators and whose outputs are connected to the inputs of electro-hydraulic valves controlling the positioner and feeder drives; a program carrier storing information on the vertical arrangement of blast holes in the face and fashioned as a gear reducer with several outputs whose number corresponds to the programmed number of blast holes vertically arranged in the face. The output shafts of the reducer, designed to turn the sections of the program presetters, have different gear ratios whose values grow in arithmetic progression, beginning from the first output shaft to the subsequent ones (cf., USSR Inventor's Certificate No. 243006).

However, at a single turn of the reducer input, the turn of the subsequent sections of the program presetter with regard to the preceding ones is a constant value. Consequently, the programmed spacing of bore holes can be increased or decreased only by one and the same value, which is necessary and sufficient, when the actual working height of the face does not correspond to the programmed one and the spacing of holes is the same. However, when the holes are not to be equidistantly spaced, it is neccessary to increase or decrease the distances between the holes by different values, which is not feasible with the use of the known device.

Another disadvantage of the known device is in that it does not allow the absolute values of all the programmed coordinates of holes to be increased or decreased by one and the same value, which is necessary when the position of the drilling rig does not correspond to the design bench mark of the face.

The primary object of the invention is to provide a program controller of the boom positioner and the feeder of the drilling tool of a self-propelled rig, as would help attain a higher efficiency of the drilling rig due to a reduction of time required for auxiliary operations in case when the actual face size does not correspond to the programmed face size and when the self-propelled drilling rig is positioned higher or lower than the design bench mark of the face.

Another object of the invention is to ensure a more accurate spacing of holes which is conductive to a more uniform breaking of the blasted rock and a higher rate of advance.

This and other objects have been achieved by providing a program controller of the boom positioner and the feeder of the drilling tool of a self-propelled drilling rig, said controller comprising a program carrier storing information on the vertical spacing of holes in the face and interacting with the program presetters connected together with sensors indicating the position of the positioner and the feeder of the drilling tool, to the inputs of comparators, and amplifiers whose inputs are connected to the outputs of said comparators and whose outputs are connected to the inputs of electro-hydraulic valves controlling the drives of the positioner and the feeder, wherein, according to the invention, the program carrier is fashioned as a screw with nuts capable of being longitudinal by displaced on said screw, the number of the nuts corresponding to the programmed number of vertically spaced blast holes, said screw having a variable pitch the variation of which is in a linear relationship with the number of its revolutions, and provided with a drive for imparting reciprocate motion to said program carrier.

Such embodiment of the invention helps increase its efficiency due to a reduction of time required for auxiliary operations in case when the self-propelled rig is positioned higher or lower than the design bench mark of working, provide a more accurate spacing of holes in the face, a more uniform breaking of the blasted rock and raise the rate of advance.

It is expedient that the drive for imparting reciprocal motion to the screw of the program carrier be fashioned as a screw with a nut interacting with the screw of the program carrier.

Such a drive is simple in design, easy and reliable to operate.

The invention will be more apparent from the description of its exemplary embodiment, reference being had to an appended drawing showing a schematic diagram of the invention being described. The program controller is fitted with a program carrier 1 fashioned as a screw 2 having a variable pitch, the variations of which is in a linear relationship with the number of its revolutions, and nuts 3 mounted on said screw, the number of said nuts corresponding to the preset number of vertically arranged blast holes.

The position of the nuts 3 corresponds to the coordinates of the programmed holes, while the spacing of said nuts 3 corresponds to the spacing of the holes. A drive made up of a screw 4 and a nut 5 interacts with the screw 2 and is intended for the reciprocating motion of the latter. Program presetters 6 and 7 have travelling parts 8 and 9 actuated by means of a screw pair 10 and connected to the indicating sensors 11 and 12, showing the location of the positioner and the feeder of a drilling tool, said sensors being kinematically coupled with boom positioner 13 and a feeder 14 of a drilling tool 15. The above travelling parts 8 and 9 of the program presetters 6 and 7 are connected to the inputs of comparators 16 and 17 whose outputs are connected to the inputs of amplifiers 18 and 19. Electro-hydraulic valves 20 and 21 connected to the inputs of the amplifiers 18 and 19 exercise the control of the drives 22 and 23 of positioner 13 and feeder 14.

The proposed device is operated as follows.

For aiming the feeder at a bore hole, the travelling parts 8 and 9 of the program presetters 6 and 7 are set, by means of a screw pair 10, against one of the nuts 3, which corresponds to the programmed coordinate of a given bore hole. Signals picked up from the program presetters 6 and 7 and from the position indicating sensors 11 and 12 are summed up by the comparators 16 and 17, amplified by the amplifiers 18 and 19 and then fed to the electro-hydraulic valves 22 and 23, thus actuating the drives 22 and 23 setting the positioner 13 and the feeder 14 into preset positions.

When the actual face height does not correspond to the design face height the screw pair 10 is used for setting the travelling parts 8 and 9 of the program presetters 6 and 7 into positions when the positioner 13 and the feeder 14 will occupy positions corresponding to the upper hole of the actual face height. Thereafter, by turning the screw 2 of the program carrier 1, the nuts 3 are brought into action until one of said nuts 3, which corresponds to the coordinate of the upper hole, takes up a position directly opposite to the travelling parts 8 and 9 of the program presetters 6 and 7. As a result, said nuts 3 will occupy positions corresponding to new hole coordinates for the actual face height. For the further operation of the device, it is necessary, while aiming the feeder 14 of the drilling tool 15 at the next bore hole, to displace the travelling parts 8 and 9 of the program presetters 6 and 7 into positions opposite to one of the nuts 3 that corresponds to the new coordinate of the bore hole.

When the actual position of the self-propelled drilling rig is higher or lower that the design bench mark, the travelling parts 8 and 9 of the program presetters 6 and 7 are brought, by means of the screw pair 10, into positions when the positioner 13 and the feeder 14 occupy positions corresponding to the lowest hole of the face. Thereafter, by turning the screw 4, it is necessary to actuate the screw 2 until the nut 5 interacting with the screw 2, the position of which corresponding to the coordinate of the lowest hole, takes up a position directly opposite to the travelling parts 8 and 9 of the program presetters 6 and 7. Furtheron, when aiming the feeder 14 of the drilling tool 15 at the next hole, the travelling parts 8 and 9 of the program presetters 6 and 7 are brought, by means of the screw pair 10, into positions against one of the nuts 3 that corresponds to the new hole coordinate.

What is claimed is:

1. A program controller of the boom positioner and the feeder of the drilling tool of a self-propelled drilling rig, which comprises: sensors indicating the positions of said positioner and feeder of the drilling tool; program presetters connected to said indicating sensors; comparators connected to said indicating sensors and program presetters; amplifiers connected to said comparators; electro-hydraulic valves connected to said amplifiers; a positioner drive connected to one of said electro-hydraulic valves; a drilling tool feeder drive connected to the other of said electro-hydraulic valves; a program carrier interacting with said presetters and storing information on the vertical location of bore holes in the face, said program carrier fashioned as a screw with a variable pitch, whose pitch variations are in a linear relationship with the number of revolutions of said screw, and nuts mounted on the latter in numbers corresponding to the programmed number of vertical holes; and a drive for ensuring the reciprocating motion of said screw.

2. A device as claimed in claim 1, wherein said drive for the reciprocating motion of the screw of said program carrier is fashioned as a screw with a nut that interacts with the screw of said program carrier.

* * * * *